United States Patent Office 2,780,658
Patented Feb. 5, 1957

2,780,658
PREPARATION OF UNSATURATED ACYCLIC HALIDES

Joseph Donald Surmatis, Pompton Plains, N. J., assignor to Hoffmann-La Roche Inc., Nutley, N. J., a corporation of New Jersey No Drawing. Application January 29, 1954, Serial No. 407,180

1 Claim. (Cl. 260—654)

This invention relates to novel processes useful in making odor-imparting agents.

For purposes of this disclosure, the term "cis" is to be understood as designating a steric configuration analogous to that of geraniol.

A quick survey of the invention is afforded by the following flow sheet:

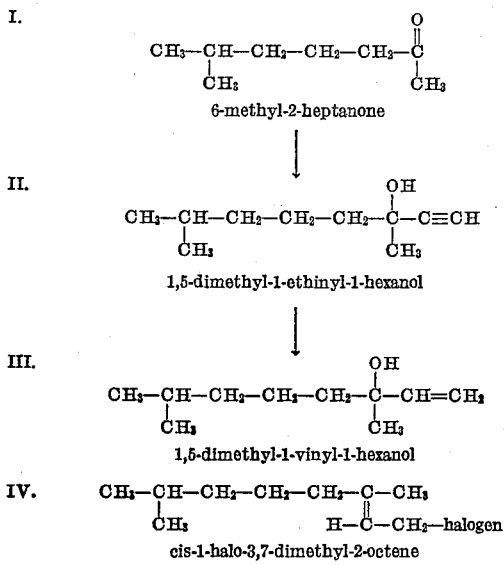

I.
$$CH_3-CH-CH_2-CH_2-CH_2-\overset{O}{\overset{\|}{C}}$$
$$\phantom{CH_3-}\overset{|}{CH_3}\phantom{-CH_2-CH_2-CH_2-}\overset{|}{CH_3}$$
6-methyl-2-heptanone II.
$$CH_3-CH-CH_2-CH_2-CH_2-\overset{OH}{\underset{|}{C}}-C\equiv CH$$
$$\phantom{CH_3-}\overset{|}{CH_3}\phantom{-CH_2-CH_2-CH_2-}\overset{|}{CH_3}$$
1,5-dimethyl-1-ethinyl-1-hexanol III.
$$CH_3-CH-CH_2-CH_2-CH_2-\overset{OH}{\underset{|}{C}}-CH=CH_2$$
$$\phantom{CH_3-}\overset{|}{CH_3}\phantom{-CH_2-CH_2-CH_2-}\overset{|}{CH_3}$$
1,5-dimethyl-1-vinyl-1-hexanol IV.
$$CH_3-CH-CH_2-CH_2-CH_2-\overset{}{\underset{|}{C}}-CH_3$$
$$\phantom{CH_3-}\overset{|}{CH_3}\phantom{-CH_2-CH_2-CH_2-}H-\overset{\|}{C}-CH_2-\text{halogen}$$
cis-1-halo-3,7-dimethyl-2-octene It will be apparent from the above flow sheet that the starting material of the invention is the known compound 6-methyl-2-heptanone (I). The procedure herein described comprises ethinylating (I) by reacting with acetylene in liquid ammonia to produce 1,5-dimethyl-1-ethinyl-1-hexanol (II); partially hydrogenating the latter by reaction with elemental hydrogen in the presence of a selective reduction catalyst to produce 1,5-dimethyl-1-vinyl-1-hexanol (III); and treating the latter with a concentrated aqueous solution of a hydrohalic acid to produce cis-1-halo-3,7-dimethyl-2-octene, preferably by treating (III) with commercial concentrated aqueous hydrochloric acid of approximately 37% concentration or commercial concentrated aqueous hydrobromic acid of approximately 48% concentration.

The invention is further disclosed in the following examples, which are illustrative but not limitative thereof:

Example 1

In a 3-liter flask fitted with an acetone-Dry Ice condenser, there was condensed one liter of liquid ammonia. Metallic sodium, 28 grams, was cut up into small pieces of about 0.1 g. each and added to the liquid ammonia in 30 minutes. Dry acetylene gas was then passed into the stirred reaction mixture until the color of the reaction turned from a deep blue to white. Acetylene was thereafter passed in at the rate of about one liter in 30 minutes. 128 grams of 6-methyl-2-heptanone was dissolved in an equal volume of diethyl ether and dropped into the stirred reaction mixture in one hour. The stirring was continued all night. The ammonia was distilled off and the residue was carefully added to one liter of 5% sulfuric acid. The oily product was washed with water until neutral and distilled under vacuum to yield 1,5-dimethyl-1-ethinyl-1-hexanol, which distilled at 132° C. at 150 mm., $n_D^{25}=1.4380$.

Example 2

308 grams of 1,5-dimethyl-1-ethinyl-1-hexanol was placed in a 5-liter flask provided with a mercury sealed stirrer. To this was added 20 grams of a lead-palladium/calcium carbonate catalyst prepared according to the specific teaching of Lindlar at page 450 of Helvetica Chimica Acta, vol. 35 (1952), and 500 cc. of petroleum ether. The reduction was carried out at 20–30° C. at atmospheric pressure until 2 atoms of hydrogen were taken up. At this point the consumption of hydrogen came almost to a stop. The flask was flushed with nitrogen and the catalyst was filtered off. After removal of the solvent, the residue was distilled under vacuum. The product, 1,5-dimethyl-1-vinyl-1-hexanol, distilled at 81° C. at 10 mm., $n_D^{25}=1.4350$.

Example 3

234 grams of 1,5-dimethyl-1-vinyl-1-hexanol was placed in a 2-liter flask provided with a mechanical stirrer. To this there was added 600 cc. of 48% hydrobromic acid. The mixture was stirred for 2 hours at room temperature. The oil layer was removed, washed twice with 500 cc. of water, and dried over anhydrous calcium chloride. The product thus obtained, cis-1-bromo-3,7-dimethyl-2-octene, had $n_D^{25}=1.4630$.

I claim:

A process of making cis-1-halo-3,7-dimethyl-2-octene which comprises reacting 1,5-dimethyl-1-vinyl-1-hexanol with a concentrated aqueous solution of a hydrohalic acid selected from the group consisting of hydrochloric acid and hydrobromic acid.

References Cited in the file of this patent

Chem. Abs., Decennial Index 1917–26, "E-O" subject Index, page 5100.

Locquin et al.: Compt. Rend. (Paris), 174, 1711–13 (1922).

Karrer et al.: Helv. Chim. Acta 23, 581–4 (1940).